(12) United States Patent
Dalumi et al.

(10) Patent No.: US 9,710,012 B2
(45) Date of Patent: Jul. 18, 2017

(54) TIMING OPTIMIZED IMPLEMENTATION OF ALGORITHM TO REDUCE SWITCHING RATE ON HIGH THROUGHPUT WIDE BUSES

(71) Applicant: SanDisk Technologies LLC, Plano, TX (US)

(72) Inventors: Efraim Dalumi, D.N. Misgav (IL); Eitan Lerner, Karmiel (IL); Baruch Cohen, Karmiel (IL)

(73) Assignee: SanDisk Technologies LLC, Plano, TX (US)

( * ) Notice: Subject to any disclaimer, the term of this patent is extended or adjusted under 35 U.S.C. 154(b) by 1103 days.

(21) Appl. No.: 13/684,124

(22) Filed: Nov. 21, 2012

(65) Prior Publication Data

US 2014/0143586 A1    May 22, 2014

(51) Int. Cl.
  *G06F 1/14*    (2006.01)
  *G06F 13/42*    (2006.01)
(52) U.S. Cl.
  CPC ............ *G06F 1/14* (2013.01); *G06F 13/4234* (2013.01); *Y02B 60/1228* (2013.01); *Y02B 60/1235* (2013.01)
(58) Field of Classification Search
  None
  See application file for complete search history.

(56) References Cited

U.S. PATENT DOCUMENTS

| | | | |
|---|---|---|---|
| 4,686,676 A * | 8/1987 | McPherson | .................... 714/797 |
| 5,363,486 A * | 11/1994 | Olson et al. | ....................... 711/3 |
| 7,701,368 B2 * | 4/2010 | Hollis | .............................. 341/55 |
| 7,990,173 B1 | 8/2011 | Tseng et al. | |
| 8,069,403 B2 | 11/2011 | Bisen et al. | |
| 8,108,664 B2 | 1/2012 | Joshi | |
| 2008/0250257 A1 | 10/2008 | Brown | |
| 2009/0177825 A1 * | 7/2009 | Joshi | ............................ 710/110 |
| 2009/0274245 A1 | 11/2009 | Brown et al. | |
| 2011/0222623 A1 | 9/2011 | Hollis | |
| 2011/0271063 A1 | 11/2011 | Kwak | |

OTHER PUBLICATIONS

PCT International Search Report—PCT/US2013/070448—dated Mar. 13, 2014.

* cited by examiner

*Primary Examiner* — Henry Tsai
*Assistant Examiner* — Juanito Borromeo
(74) *Attorney, Agent, or Firm* — Stoel Rives LLP

(57) ABSTRACT

A dynamic bus inversion (DBI) circuit disposed between a transmitter and a receiver for generating an inversion control signal that is communicated to the receiver and used to perform inversion control on data communicated along a data path between the transmitter and the receiver includes a delay data setup circuit to receive the data from the transmitter. A majority vote function circuit is used to perform majority voting for consecutive bits of data output by the delay data setup circuit to generate majority data output. An inversion control circuit receives the majority data output, retrieves feedback data from a preceding inversion control output and interprets the two data to generate inversion control signal, which is used to perform inversion control on data along the data path before being communicated to the receiver. The inversion control signal is used by the receiver to interpret the data received from the data path.

20 Claims, 8 Drawing Sheets

SSO results with Dynamic Bus Inversion

Assuming 8 bits random data
- Without DBI algorithm
  - MAX SSO – 8 out of 8.
  - Average – 4 out of 8.
- With DBI algorithm
  - Adding one "inversion control" output
  - MAX SSO – 4 out of 9.
  - Average – 3.2734 out of 9.

The max SSO will reduce from 8/8 to 4/9.

The average SSO will reduce from 4/8 to 3.2734/9.

Figure 5

TIMING OPTIMIZED IMPLEMENTATION OF ALGORITHM TO REDUCE SWITCHING RATE ON HIGH THROUGHPUT WIDE BUSES

BACKGROUND

Field of the Invention

The present invention relates to communication over a bus, and more particularly, to implementing dynamic bus inversion by adding hardware resources.

Description of the Related Art

In various computer and memory related devices, it is common for various elements to be connected by one or more communication busses for transferring commands and data. For example, in a flash memory device, such as a memory card or USB memory drive, the device communicates through an interface that acts as a bus. Additionally, within the device various components communicate with each other using one or more busses. Using the flash memory device, as an example, the various components of the device may include controller connected to one or more memory chips through one or more busses.

In memory systems where power consumption is a concern, the technique of bus inversion is often employed. Power consumption depends on the amount of transition for the bus lines, wherein the greater number of transitions results in higher power consumption. Within the transition, a high to high transition consumes less power than high to low or low to high transitions. The idea of data inversion is employed to minimize the number of transitions in the bus, and the consequent power usage. A high switching noise occurs when all of the data bits in the bus lines need to switch from high to low or low to high at the same time, also termed "simultaneously switching output (SSO)". The increased switching leads to system integrity issues. It is, therefore, desirable to reduce the high switching noise and minimize power consumption.

In order to minimize the number of transitions in the bus and to reduce power consumption, data inversion technique is employed. The idea of data inversion technique, such as dynamic bus inversion (DBI) technique, is to minimize the number of transitions in the bus and the consequent power usage, by determining at each cycle whether to invert the data bus and to provide an indication of this to the receiving end, so that the receiving end knows whether or not to re-invert data in order to extract the correct content. This requires the system, at the receiving end, to determine at each transfer cycle whether or not to change inversion of the bus. Such determination can be accomplished using a process called "majority voting".

One way of implementing the DBI technique is to divide one wide bus into few narrow busses, and to add separate inversion controls to each one of the narrow busses. This is true, especially for implementing the "majority voting" for buses that transfer high frequency data. The main disadvantage with this solution is that it leads to additional output requirements, such as extra bits (DBI bit) and extra pins (DBI pin), to indicate to the receiver whether or not the bus is inverted. Another disadvantage with this DBI technique is that it causes excessive toggling of data bus lines leading to signal integrity issues in the data bus lines.

It is within this context that embodiments of the present invention arise.

SUMMARY

In one embodiment, a dynamic bus inversion (DBI) circuit is provided that addresses the disadvantages of the conventional system. The DBI circuit is coupled between a transmitter and a receiver and is configured to generate an inversion control signal. The inversion control signal is communicated to the receiver and is used to perform inversion control on data communicated along a data path between the transmitter and the receiver. The DBI circuit includes a delay data setup circuit that is configured to receive the data from the transmitter. The DBI circuit also includes a majority vote function circuit that is configured to perform the majority voting for consecutive bits of the data obtained from an output of the delay data setup circuit and to generate majority data output. An inversion control circuit within the DBI circuit is configured to receive the majority data output from the majority vote function and retrieve feedback data from a preceding inversion control output of the inversion control circuit, interpret the majority data output and the feedback data to generate inversion control signal. The inversion control signal is used to perform the inversion control on the data along the data path before being communicated to the receiver and the inversion control signal used by the receiver for interpretation of the data received from the data path of the DBI circuit.

In another embodiment, a method for implementing dynamic bus inversion (DBI) is disclosed. The method includes receiving data into a delay data setup circuit. The delay data setup circuit is disposed along a data path between a transmitter and a receiver and is configured to receive the data communicated by the transmitter. A majority voting is performed for consecutive bits of the data obtained from an output of the delay data setup circuit using a majority vote function circuit to generate majority data output. Inversion control signal is generated for the majority data output received from the majority vote function using the inversion control circuit. The inversion control circuit retrieves a feedback data from a preceding inversion control output of the inversion control circuit and interprets the majority data output and the feedback data to generate the inversion control signal. Inversion control is performed on the data along the data path using the inversion control signal before communicating to the receiver, wherein the inversion control circuit acts to select either inverted or non-inverted form of the data for communication to the receiver in the form identified by the inversion control signal. The inversion control signal is also transmitted to the receiver so that the receiver can interpret the data communicated along the data path.

In yet another embodiment, a dynamic bus inversion (DBI) circuit coupled between a transmitter and a receiver, is disclosed. The DBI circuit is configured to generate an inversion control signal that is communicated to the receiver and used to perform inversion control on data communicated along a data path between the transmitter and the receiver. The DBI circuit includes a delay data setup circuit having a plurality of delay data setup elements. Each of the plurality of delay data setup elements is configured to receive data transmitted by the transmitter. The DBI circuit also includes a majority vote function circuit that is configured to perform majority voting and to generate majority data output. The majority vote function circuit includes an independent majority vote function for each delay data setup element and is configured to obtain a distinct set of consecutive bits of the data output by the respective delay data setup element to generate majority data output. The independent majority vote functions in the majority vote function circuit work in parallel. The DBI circuit further includes an inversion control circuit that is configured to receive the majority data output from each of the independent majority vote functions within the majority vote function circuit and to retrieve feedback data from a preceding inversion control output generated by the inversion control circuit, interpret the majority data output and the feedback data to generate inversion control signal. The inversion control signal perform the inversion control of the data along the data path before being communicated to the receiver. The inversion control signal is used by the receiver to interpret the data communicated from the data path of the DBI circuit.

Majority vote function was difficult to implement, in conventional system, on wide buses and/or at high data rate as the majority vote function required feedback from the data output for the implementation. The current embodiments of the DBI circuit address this issue by removing the feedback from the majority vote function and, instead, using the feedback at the inversion control that processes the output from the majority vote function. The DBI circuit of the various embodiments described herein provides an efficient way of implementing the DBI technique based on pipeline approach and does not require feedback at the "majority vote" function, thereby providing fast implementation even on wide buses.

Other aspects and advantages of the invention will become more apparent from the following detailed description, taken in conjunction with the accompanying drawings, illustrating by way of example the present invention.

BRIEF DESCRIPTION OF THE DRAWINGS

The invention may best be understood by reference to the following description taken in conjunction with the accompanying drawings.

FIG. 5 illustrates results of SSO using the DBI, in one embodiment of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The various embodiments describe a dynamic bus inversion (DBI) circuit to address the various disadvantages of conventional system. One of the advantages of this circuit is that a plurality of independent majority vote functions can be employed to evaluate the data bits of input data in parallel. It is possible to employ multiple independent majority vote functions as the majority vote functions are configured to use consecutive data bits of data communicated along a data path from the transmitter, as inputs instead of waiting for feedback data from data output to generate majority data output. The DBI circuit employs an inversion control circuit to process the output of the majority vote function using feedback data from a preceding inversion control output. The plurality of majority vote functions working in parallel help in reducing the process time for evaluating the input data while alleviating one of the bottleneck commonly experienced at the majority vote function. In conventional system, significant performance bottleneck occurred when the circuit employed a single majority vote function that required a combination of input data and feedback data from data output as inputs to the majority vote function. The feedback data was a result of processing preceding set of data by the majority vote function. This required the majority vote function to receive the feedback data and complete processing the combination of data in one single clock cycle resulting in the timing bottleneck. In some embodiments discussed herein, the number of majority vote functions used in the DBI circuit depends on the data bandwidth of the data path used in the transmission of data. The data bandwidth also drives the number of clock cycles that each majority vote function has to implement the majority vote function. The current circuit overcomes the issues of the conventional systems as outlined above and provides other advantages, aspects, and features that will become obvious in the following detailed embodiments.

Figure 1:
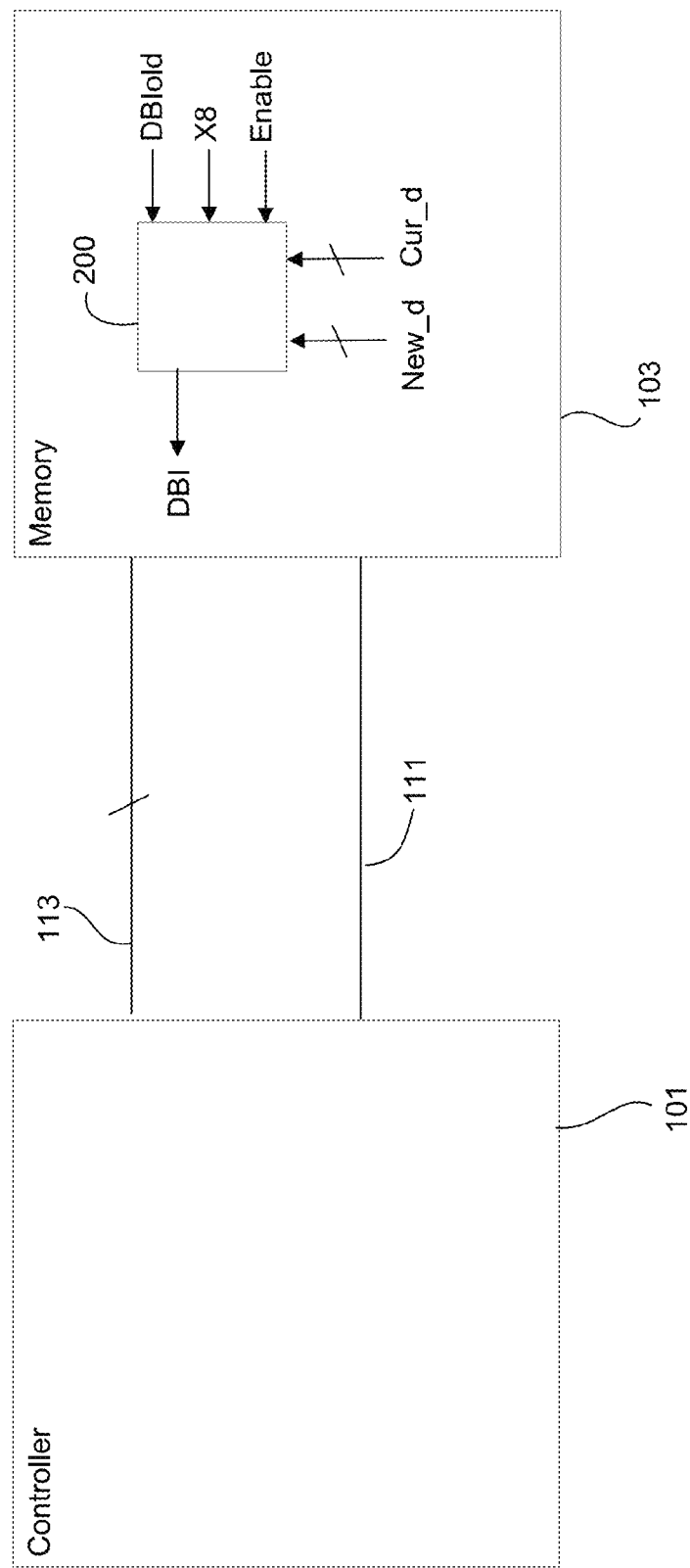
FIG. 1 is a memory device in which an exemplary embodiment is provided, in accordance with one embodiment of the present invention.

FIG. 1 shows an exemplary memory system that uses the circuit described herein. The memory system depicted in FIG. 1 is a flash memory system that includes a controller chip 101 and a memory chip 103. The controller 101 is defined to be electronically connected to a host computer system (not shown), such as a personal computer, a digital camera, a personal digital assistant, or essentially any other type of computer device that includes a digital processor. In one embodiment, the controller is part of the memory device (i.e. memory chip) 103 and mediates transfer of data between the host (not shown) and the memory chip 103 as well as storage of data on the memory. The data referred to herein that is either read from memory or written to memory includes data signals transmitted to and from the host. In some embodiments, the controller function is executed on the host. The controller communicates with the memory through one or more busses. As illustrated in FIG. 1, the controller communicates with the memory through a data bus 111 and one or more control lines 113. Although shown separately, the control lines 113 may be combined with the data bus line 111. It should be noted that the memory device 103 may be embedded as part of the host computer system, or may be included in a memory card that is removably insertable into a mating socket of the host computer system. Such a memory card may include the entire memory device 103, or portions of the memory device 103, with a remainder of the memory device 103 defined on other components interfaced with the host computer system and/or memory card. Memory control circuit within the memory device 103 includes registers for receiving data and other signals.

Figure 2A:
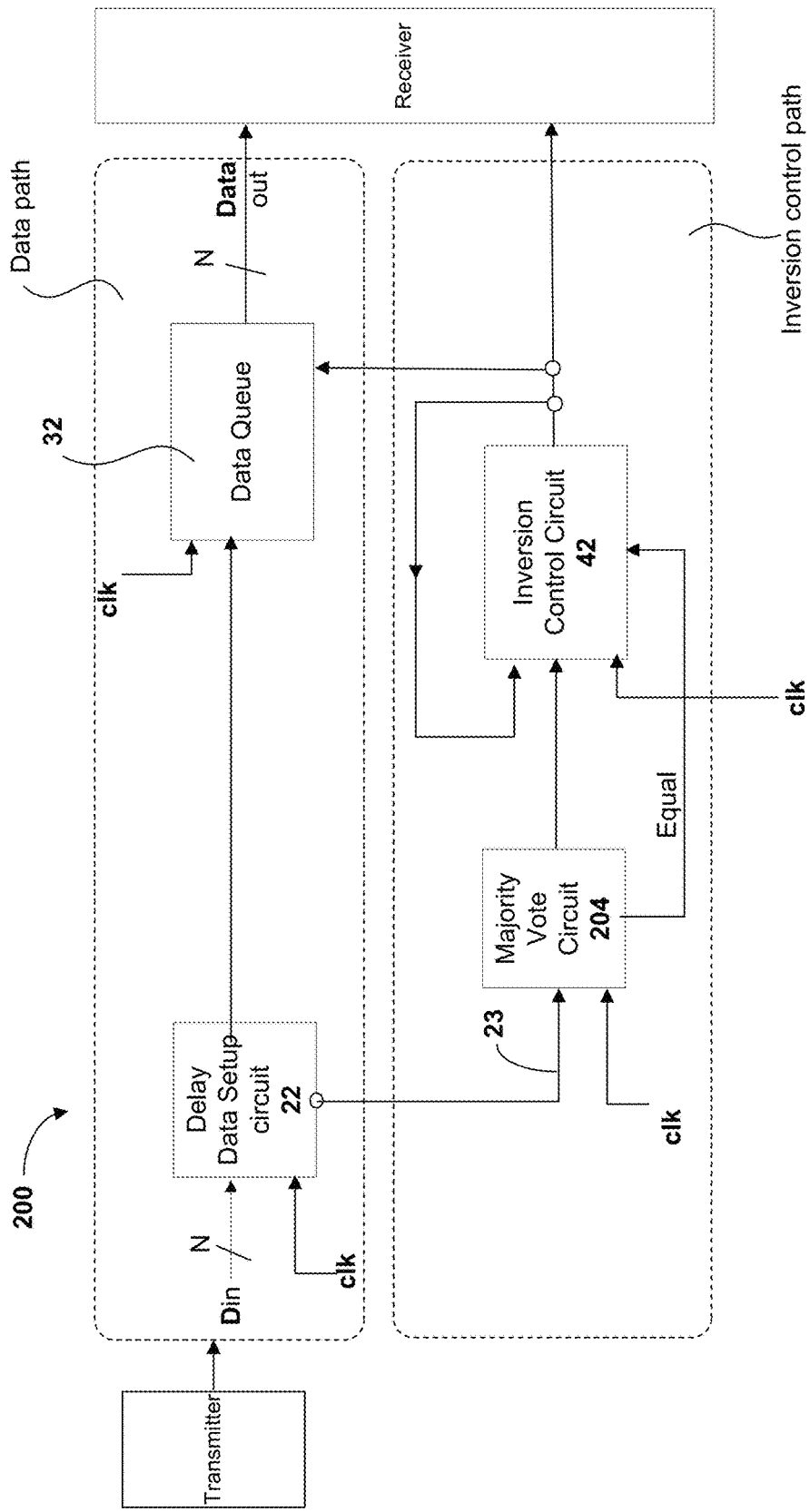
FIG. 2a illustrates a simplified block diagram of a circuit used for implementing majority vote logic with feedback from inversion control output data, in accordance with one embodiment of the present invention.

FIG. 2a illustrates an implementation of a dynamic bus inversion circuit that is coupled between a transmitter and a receiver. The DBI circuit includes a majority vote function circuit with a plurality of majority vote functions that receives and processes consecutive bits of the data communicated along a data path defined between the transmitter and the receiver and does not use any feedback data from data output, in one embodiment. The feedback data is moved away from the majority vote function into an inversion control circuit. The feedback data that is used by the inversion control circuit for generating the inversion control signal is from a preceding inversion control output and not from data output alleviating the bottleneck. The inversion control circuit receives the majority data output from the majority vote function and feedback data from a preceding inversion control output and generates the inversion control signal. As illustrated in FIG. 2a, the majority vote function receives consecutive bits of data from an output of a delay data circuit which receives the data from the transmitter. The transmitter could be a host device transmitting data to a receiving device, such as memory chip, along a data path. In one embodiment, the input data is received as a plurality of data bits over the data path, such as a data bus, wherein the number of data bits transmitted over the data bus is based on the bandwidth of the bus over which the input data is transmitted. The input data is examined and evaluated so as to reduce output toggle rate at the output end. To reduce output toggle rate, the data communicated over the data path is evaluated to determine if inversion needs to be done to reduce the toggling at the output end. Based on the determination, the data is either inverted or not before it is communicated to the receiver. In order to determine if inversion needs to performed, a shared signal is generated that identifies if the inversion of the data occurred so that the original data can be reconstructed at the receiver (i.e., receiving device) end using the inversion control signal.

The current embodiments of the invention provide a way to implement Dynamic Bus Inversion by adding additional hardware resources to resolve timing violations while minimizing the addition of number of outputs. In one embodiment, the implementation is accomplished by adding a single extra output in the form of a shared line (also known as inversion control signal line) that is used to transmit inversion control signal and by adding a plurality of majority vote functions to address timing violations. Each of the plurality of majority vote functions is provided with distinct sets of consecutive bits of the data that is being transmitted along the data path and is given a defined number of clock cycles to complete the processing of the data bits. The number of clock cycles for processing the data bits varies with the bandwidth of the communication bus with a minimum number of clock cycles being at least greater than 1. As each of the majority vote functions are provided with multiple clock cycles to process the data bits, the timing violation issues normally associated with the conventional system using a single majority vote functions, are effectively addressed. Details of the role played by the plurality of majority vote functions in addressing timing violations will be described in greater detail with reference to FIG. 3.

Referring to FIG. 2a, in one embodiment, a DBI circuit 200 includes a plurality of circuits for implementing the dynamic bus inversion. The circuit 200 includes a data queue circuit 32, a delay data setup circuit 22, a majority vote function circuit 204 and an inversion control circuit 42. The data queue circuit, in one embodiment illustrated in FIG. 2b, includes a storage, such as a FIFO circuit 36, to process bits of data transmitted by the transmitter in a specific order, such as first-in-first-out order, and a selection circuit, such as an inverter circuit 38, for maintaining the bits of the data in the original form in the order dictated by the FIFO circuit 36 and an inverted form of the FIFO ordered bits of the data communicated over the data path. The two forms are maintained in the selection circuit 38 in order to determine which one needs to be selected and forwarded to the receiver based on the inversion control signal generated by the inversion control circuit.

The delay data setup circuit 22 is configured to receive the data from the transmitter and to output a set of consecutive bits of the data 23 to majority vote function circuit 204. The bits output 23 by the delay circuit 22 to the majority vote function circuit 204 may, in one embodiment, include a combination of bits of data (i.e., delay data 202) from a storage element and bits of data (i.e., pass-through data 201) from the transmitter, as illustrated in FIG. 2c. The logic provided within the delay circuit 22 will determine which set of consecutive bits of the data to output 23 from the delay data setup circuit 22. The delay data setup circuit 22 will, in one embodiment illustrated in FIG. 2c, store the delay data 202 in the storage 205 within the delay circuit 22 and wait for the pass-through data 201 from the transmitter before outputting 23 the delay data 202 and the pass-through data 201 to the majority vote function. The pass-through data 201 is then stored in the storage 205 within the delay circuit 22 for subsequent evaluation. In one embodiment, the storage for storing the delay data 202 includes one or more registers. Data bits are communicated by the transmitter along the data path in distinct clock cycles and the delay circuit 22 stores the data bits in the storage and waits for subsequent data bits to arrive at the delay circuit 22 before outputting consecutive bits of the data 23 to the majority vote function circuit 204 for evaluation. For simplicity sake, the various embodiments are described as receiving a pair of consecutive bits of data at the delay circuit at a time. Receiving and processing a pair of consecutive bits of the data is exemplary and should not be considered limiting. The delay circuit 22 may be configured to receive, store one or more bits of the data and output a set of consecutive bits of the data to the majority vote function wherein the set of consecutive data bits may include more than two data bits and the delay circuit 22 may include appropriate storage and logic to enable the delay circuit to output the set of consecutive data bits.

Referring to FIG. 2a, the majority vote function circuit 204 evaluates the set of consecutive data bits output 23 by the delay circuit 22 and generates majority data output for the set of consecutive data bits. In the example illustrated in FIG. 2a, the data bits are output 23 to the majority vote function in a sequential manner. The majority vote function 204 obtains the consecutive data bits that are output by the delay data circuit 22, performs the majority voting for the consecutive data bits and generates majority data output that is fed to the inversion control circuit 42.

The inversion control circuit 42, in response to receiving the majority data output from the majority vote function circuit 204, retrieves feedback data from a preceding inversion control output of the inversion control circuit and acts to interpret the feedback data and the majority data output to generate inversion control signal. The generated inversion control signal provides an indication of whether the input data bits communicated along the data path should be inverted or not. The inversion control signal is fed to the data queue. The data queue uses the inversion control signal to perform inversion control on the data along the data path before communicating the selected data to the receiver. The data queue selects either an inverted form or a non-inverted form of the data bits communicated along the data path for forwarding to the receiver. The inversion control signal is also transmitted to the receiver through an inversion control signal line so that the receiver will be able to interpret the data bits communicated through the data path so as to recover the data bits transmitted by the transmitter. As illustrated in FIG. 2a, the delay circuit 22 and the data queue circuit 32 together define the data path followed by the data bits transmitted by the transmitter. The majority voting circuit 204 and the inversion control circuit together define the inversion control path that defines whether the data bits from the data queue should be inverted to recover the original data bits or not.

Figure 2B:
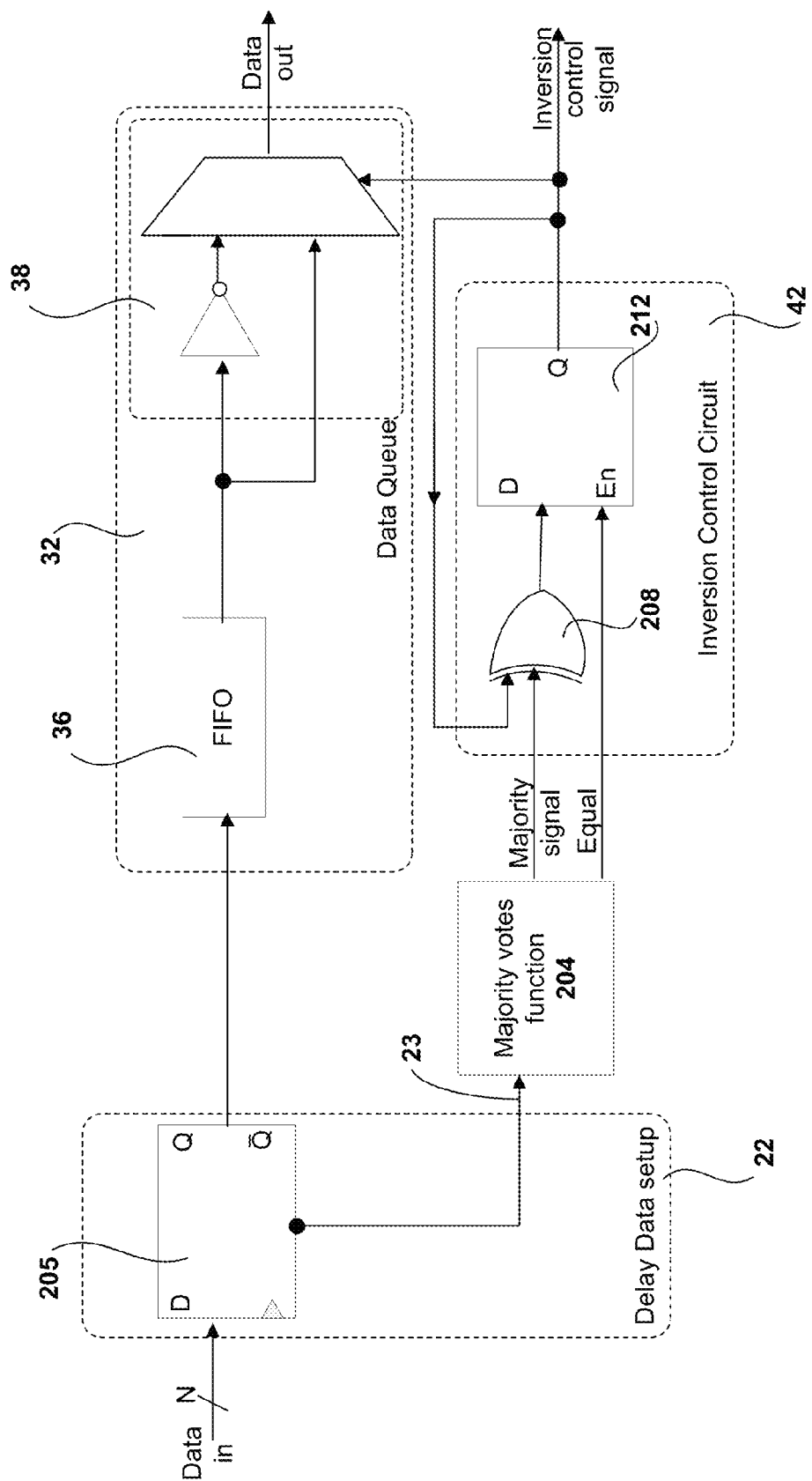
FIGS. 2b and 2c illustrate a more detailed block diagram of the system illustrated in FIG. 2a used for implementing majority vote logic with feedback from inversion control output data, in accordance with alternate embodiments of the invention.
Figure 2C:
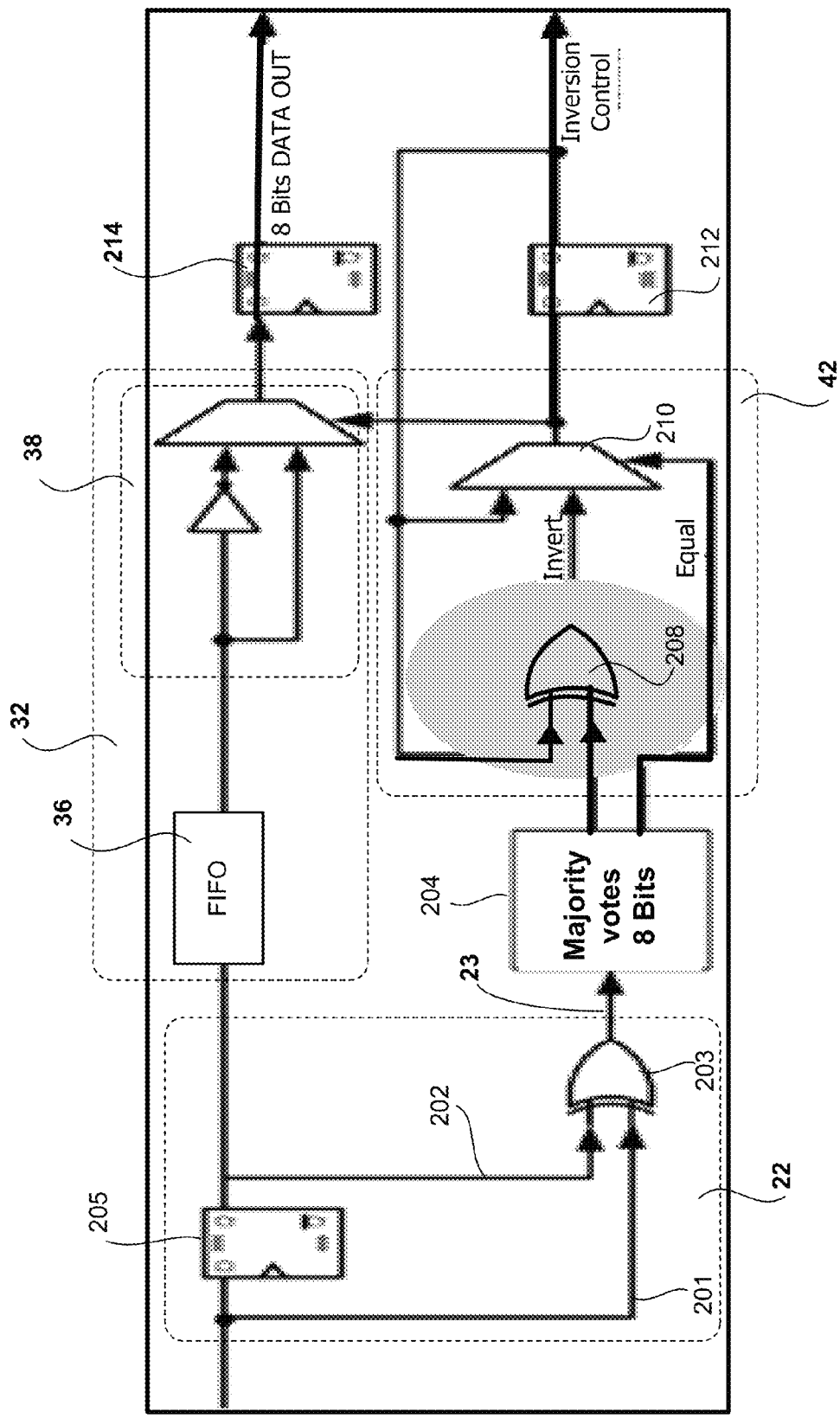

FIG. 2b illustrates a simplified block diagram of some of the circuit elements within the data queue circuit 32 and inversion control circuit 42 illustrated in FIG. 2a, of the DBI circuit. The inversion control circuit 42 includes an inverter circuit and a storage element. In one embodiment, the inverter circuit is a XOR gate 208, which is used for processing the majority data output from the majority vote function circuit 204 and the feedback data from the preceding inversion control output by the inversion control circuit to generate inversion control signal. The inversion control signal is stored in the storage, such as a register 212, for subsequent processing by the inverter circuit. The register 212 also receives the Equal signal from the majority vote function circuit and uses the information within the Equal signal to encode inversion control signal for either selecting the inverted form of the data bits or the non-inverted form (i.e., original form) of data bits in the data queue circuit 32. The inversion control signal generated by the inversion control circuit 42 is provided at the data queue circuit 32.

The data queue circuit 32 includes a storage, such as a FIFO element 36, and a selection circuit, such as a multiplexer. The selection circuit 38 within the data queue circuit 32 receives the inversion control signal from the inversion control circuit 42 and selects the appropriate set of data bits (i.e., either inverted form or the non-inverted form) for transmitting to the receiver. The selection of the appropriate set of data bits ensures less toggling at the receiver end thereby reducing power consumption. The inversion control signal is also transmitted to the receiver so that the receiver can determine whether to invert or not invert the data bits communicated along the data path in order to recover the original data bits transmitted by the transmitter. The current embodiments show significant performance improvement over that of the conventional system due to the fact that processing of the feedback is moved away from the majority vote function circuit to the inversion control circuit and to the fact that the feedback coming from the preceding inversion control output of the inversion control circuit rather than from the data output.

Figure 3:
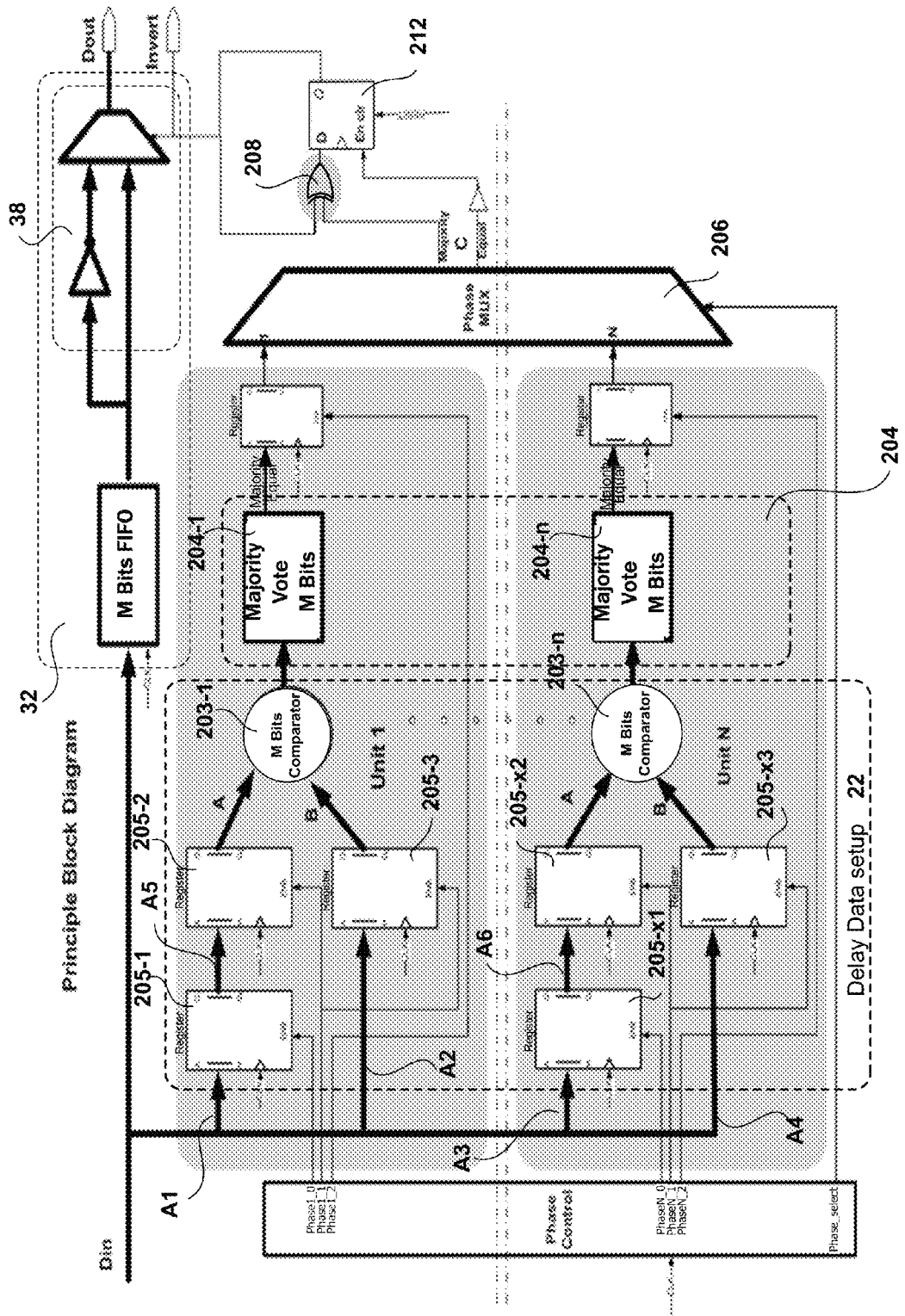
FIG. 3 illustrates a block diagram of a system used for implementing majority vote logic with multi-cycle pipelined approach for handling high frequency multi-cycle clock, in accordance with one embodiment of the present invention.

FIG. 2c illustrates a snapshot view of a basic DBI circuit. In order to understand the functionality of the various elements within the circuit, the DBI circuit is shown to include a single majority vote function. However, in reality, multiple majority vote functions are employed, as illustrated in FIG. 3. Referring now to FIG. 2c, the DBI circuit includes the delay data setup circuit 22, the data queue circuit 32, majority vote function circuit 204, and the inversion control circuit 42. The data queue circuit 32 includes a storage, such as FIFO circuit 36 to organize the data bits transmitted from the transmitter and an inverter circuit 38 to determine whether to invert the data bits from the FIFO circuit 36 based on the information received from the inversion control circuit 42. The data bits in inverted or non-inverted form selected for transmission to the receiver are sampled in a second storage, such as register 214, prior to transmission to the receiver. The practice of storing the inverted and the non-inverted form is to keep the outputs sampled and to avoid combinational output.

Figure 4:
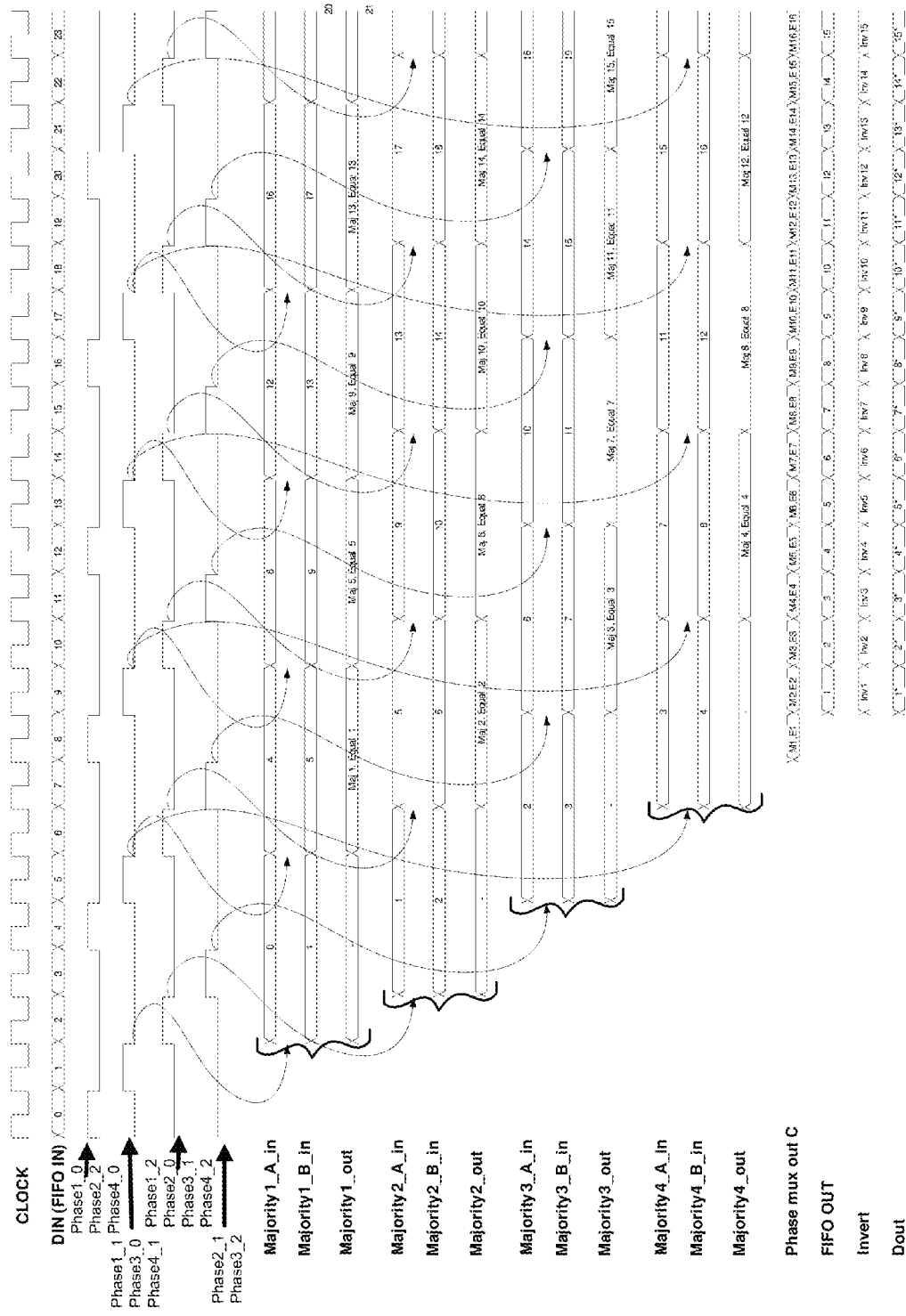
FIG. 4 illustrates a basic waveform diagram of majority vote logic using multi-cycle approach, in accordance with one embodiment of the present invention.

The delay data setup circuit 22 includes a storage, such as register 205, to store the data bits as they arrive at the delay circuit 22. The delay circuit 22 provides a staging area for the data bits prior to generating an output to the majority vote function circuit. When a first data bit arrives at the delay circuit 22, the data bit is stored in the register 205. The delay circuit 22 then waits for a consecutive data bit to arrive from the transmitter. When the consecutive data bit of the input data is received at the delay circuit 22, the consecutive data bit is provided as pass-through data bit. The receipt of the consecutive data bit acts as a trigger event to retrieve the delay data bit stored in the register 205 and to forward to the XOR gate 203 for further processing. This is illustrated in FIG. 2C as the delay data bit 202 obtained from the register 205 and the pass-through data bit 201 received from the transmitter, which are both provided as input to the XOR gate 203 for evaluation. It should be noted herein that the delay data bit 202 and the pass-through data bit 201 are each obtained when the respective data bits have attained a stable state at the rising edge of the clock signal, as illustrated in FIG. 4. The XOR 203 gate compares the values of the first and the second data bits in the pair to determine if the data bit values are different. This information is then fed as input 23 to a majority vote function circuit 204. The majority vote function circuit 204 processes the information from the XOR gate 203 and generates a majority data output.

After forwarding the delay data bit 202 to the XOR gate 203, the data bit represented as delay data bit 202 in register 205 is replaced by the data bit represented by the pass-through data bit 201 and the delay circuit waits for the next consecutive data bit to arrive from the transmitter in subsequent clock cycle. When next consecutive data bit arrives at the delay circuit, the next consecutive data bit will act as the pass-through data bit and the delay circuit retrieves the delay data bit stored in the register 205 and forwards the set of consecutive data bits to the XOR gate for processing and providing output to the majority vote function circuit. In order to provide a better understanding of the various embodiments, a simple example involving a pair of consecutive data bits is shown. Further, a plurality of delay circuit elements may be provided within the delay circuit with each delay circuit having storage, such as one or more registers, to store the delay data separately and to provide the consecutive set of data bits to the XOR gate within the delay circuit. The majority vote function circuit, similarly, includes a plurality of majority vote functions to receive the consecutive bits of data from respective ones of the plurality of delay circuit elements to generate majority data outputs for each of the respective sets of consecutive data bits. The majority vote functions operate in parallel processing the sets of consecutive data bits using multiple clock cycles. Implementation of majority vote functions using multi cycle approach will be described with reference to FIG. 3.

Continuing to refer to FIG. 2c, the resulting majority data output for the processed set of data bits from the majority vote function circuit is fed to an inverter circuit, such as second XOR gate 208, in the inversion control circuit 42 to determine if the data bits communicated along the data path need to be inverted in order to reduce the toggle rate at the receiving end. In response to receiving the majority data output, the XOR gate 208 retrieves feedback data related to preceding inversion control output and compares the two values to determine the inversion control signal that is forwarded to the data queue circuit 32. The feedback data for the preceding inversion control output may have been stored in a storage, such as register 212, and retrieved for comparison at the second XOR gate 208. If it is determined that it is optimal to invert the data bits in the data queue circuit 32, then an inversion control signal is generated encoded with this information and transmitted to the receiver through the inversion control signal line and to the inverter circuit 38 within the data queue circuit 32 to perform the inversion control on the data along the data path. The selector in the data queue circuit selects the inverted form or the non-inverted form of the data bits so that data in the form identified by the inversion control signal is transmitted to the receiver. The selected form of data bits reduces the toggling rate when transmitted to the receiver. The information encoded in the inversion control signal enables the receiver to properly interpret the data bits in order to recover the data bits transmitted by the transmitter.

The process of transmitting consecutive set of data bits and majority voting can be efficiently managed by employing multiple delay circuit elements and majority vote functions with each delay circuit element providing outputs that are used by a corresponding majority vote function. The multiple delay circuit elements and majority vote functions enable sets of consecutive data bits to be processed separately and in parallel by respective delay circuit element and majority vote function pair. Additionally, the parallel processing allows each pair of delay circuit and majority vote function circuit to take multiple clock cycles instead of single clock cycle to process the sets of consecutive data bits, thereby overcoming any timing violation and easing any performance bottleneck.

In one embodiment, the number of clock cycles available for processing each set of consecutive data bits is driven by the bandwidth of the data path through which the input data is being transmitted. FIG. 3 illustrates an implementation of majority vote function using multi-cycle approach, in one embodiment of the invention. In one embodiment, as illustrated in FIG. 3, each of the data bits arrive at the delay circuit and attain stable states at distinct clock cycles and are stored in the delay circuit in separate storage elements, represented by registers 205 (205-1, 205-2, . . . 205-($n$−1), 205-$n$), and retrieved for processing by corresponding delay circuit elements, represented as XOR gates (203-1 through 203-$n$), and output to the respective majority vote functions (204-1 through 204-$n$). In one embodiment illustrated in FIG. 3, the data bits provided to the XOR gates includes bits from the storage elements. The XOR gates are illustrated in FIG. 3 as "M Bits comparator", where M is an integer. In one embodiment, M is equal to 2, wherein pairs of consecutive input data bits are identified from the input data and processed by an XOR gate 203/majority vote function circuit 204 pair.

In one embodiment illustrated in FIG. 3, when a first data bit received at the delay circuit attains a steady state at phase 0 of the clock cycle, the delay circuit 22 loads the value of the first data bit into registers 205-1 and 205-3. When a second data bit is received at the delay circuit and a stable state is attained at phase 1 of the clock cycle, the delay circuit 22 transfers the first data bit from register 205-1 to register 205-2 and updates the value of the second data bit into registers 205-1 and 205-3. In one embodiment, each data bit arrives and attains stable state at a falling edge of the clock cycle and maintains the stable state for at least a full clock cycle. The logic encoded in the delay circuits will allow the registers of a particular delay circuit to fully loaded with data bit values prior to engaging elements of a successive delay circuit. For instance, in the example illustrated in FIG. 3, initially all the registers in all the delay circuits are empty. When a first data bit is received at the first delay circuit represented as "Unit 1", the first data bit value is loaded onto registers 205-1 and 205-3 as shown by arrows A1, A2. When a second data bit arrives at the first delay circuit, it can be seen that register 205-2 is empty. The logic built into the delay circuit will move the first data bit from register 205-1 to register 205-2 in response to receiving the second data bit, as illustrated by arrow A5 and registers 205-1 and 205-3 are loaded with the second data bit, as shown by arrows A1, A2. Now the available registers within the first delay circuit are full and two things happen. First, the consecutive set of data bits (i.e. first and the second data bits) are retrieved from the respective registers 205-2 and 205-3 and forwarded to the comparator circuit 203-1, as illustrated by arrows A and B in delay circuit unit 1. Second, the second data bit that caused the registers of the first delay circuit to be completely loaded is also stored in registers 205-$x$1 and 205-$x$3 of the next delay circuit represented as "Unit N" in FIG. 3, as illustrated by arrows A3, A4, wherein '$n$' is equal to 2. When a third data bit is received at the system, the third data bit is directed to the second delay circuit (Unit N). In response to receiving the third data bit, the second data bit is moved from the register 205-$x$1 to register 205-$x$2, as represented by arrow A6 and the third data bit is loaded onto registers 205-$x$1 and 205-$x$3, as represented by arrows A3, A4. The third data bit causes the registers in the Unit N's delay circuit to be completely loaded. As a result, the third data bit is also loaded onto registers 1 and 3 of the Unit N+1$^{st}$ delay circuit and the process continues. Each delay circuit is then provided with an M bit comparator 203-1 to process the set of consecutive data bits and generate an output. Consequently, the first and the second data bit values are retrieved from the corresponding registers 205-2 and 205-3 and the set of consecutive data bits is presented at the respective M bit comparator 203-1 for comparison. In one embodiment, the M bit comparator 203-1 is an XOR gate. The output from the comparator 203-1 is obtained by the corresponding majority vote function 204-1 and the majority voting is performed to generate the first majority data output. Similarly, the set of consecutive data bits are retrieved from registers 205-$x$2 and 205-$x$3, respectively, and provided as inputs to the Unit N's comparator 203-$n$. Results of the comparison from the XOR gate 203-$n$ is output to the nth majority vote function 204-$n$ to generate a nth majority data output and so on.

Each of the majority vote functions are then allowed to perform the majority voting in defined number of clock cycles. In one embodiment, the number of XOR gates, majority vote functions and number of clock cycles for processing each set of consecutive data bits depend on the bandwidth of the communication data path along which the data is transmitted from the transmitter to the receiver. For example, when the interface circuit has n-bandwidth communication bus, the number of delay circuits, number of majority vote functions within the majority vote function circuit and number of clock cycles to process each set of consecutive data bits of the input data is equal to '$n$', where '$n$' is an integer. In a specific example, with a 8 bit wide communication bus, the DBI circuit may employ 8 sets of delay circuits and 8 majority vote functions, with each majority vote function allowed to process a distinct set of consecutive data bits provided by the respective delay circuit in 8 clock cycles before the next set of consecutive data bits are presented at the majority vote function for processing.

Continuing to refer to FIG. 3, the majority data output from each of the majority vote functions is multiplexed using a phase MUX 206. The phase MUX 206 receives the majority data output from the majority vote functions and is configured to select specific one of the majority data output from a majority vote function to forward to the inversion control circuit for further processing at each clock cycle, based on a phase select signal received from phase control module. In response to receiving the majority data output forwarded by the phase MUX 206, an inverter circuit 208, such as a second XOR gate, retrieves feedback data from a preceding inversion control output of the inversion control circuit and process the majority output data and the feedback data to determine if the data bits from the data bus is to be inverted or not and an inversion control signal is generated by the second XOR gate 208 encoding the inversion control information. The inversion control signal is forwarded to the inverter circuit element 38 within the data queue circuit 32. The inverter circuit will perform the inversion control of the data bits in the data queue using the information in the inversion control signal. In one embodiment, an appropriate signal is asserted at the inverter circuit. Based on the asserted signal at the inverter circuit 38, the data bits in the original form or the inverted form will be selected for transmission to the receiver. The inversion control signal is also forwarded to the receiver through the inversion control signal line so that the receiver can properly interpret the data bits communicated along the data path. The receiver upon receiving the data bits and the inversion control signal, decodes the information in the inversion control signal and recover the data. The recovered data is in the form transmitted by the transmitter.

It should be noted herein that the various embodiments described herein extensively as processing data bits one pair at a time by the plurality of delay circuit and the majority vote functions are exemplary and should not be considered restrictive. Consequently, more than two data bits may be processed by each of the delay circuits and the majority vote functions at a given time, as indicated in FIG. 3 by the "M Bits Comparator" and "Majority vote M bits," where M is an integer that is equal to or greater than 2. The inversion control output information from the second XOR 208 is stored in register 212 so that it can be retrieved as feedback data and used to process subsequent majority data outputs.

It should be noted herein that the DBI circuit alleviates the bottleneck encountered at majority vote function of conventional system, by employing a plurality of delay circuits and a plurality of majority vote functions for processing the sets of consecutive data bits of the input data. Each of the plurality of majority vote function is provided with a pre-determined number of clock cycles to process the given set of consecutive data bits before a subsequent set of consecutive data bits is received by the same delay circuit and output to the same majority vote function for processing, thereby eliminating timing violation at the majority vote function. The DBI circuit also addresses the bottleneck at the majority vote function by avoiding using feedback of data out as one of the input to the majority vote function. The majority vote function uses set of consecutive data bits of input data for generating the majority data output thereby shifting the feedback data away from the majority vote function and onto an inverter circuit within an inversion control circuit, thereby reducing the bottleneck at the majority vote function. The second XOR gate uses feedback data from a preceding inversion control output as one of the inputs and the majority data output from the majority vote function as the second input to generate the inversion control output. The bottleneck resulted when a single majority vote function was used in the DBI circuit, wherein the majority vote function had to wait to receive the feedback data of the output data (inverted or not inverted) from the preceding cycle of majority vote function processing in order to process the current set of input data bits. The DBI circuit of the current embodiments, uses the concept that Majority (!A XOR B) is the same as !(Majority(A XOR B)). By eliminating the feedback from the data out as one of the inputs to the majority vote function and instead using consecutive set of data bits as inputs and shifting feedback away from the majority vote function to the output end, it is possible to add more hardware (in the form of majority vote functions) to the DBI circuit so as to resolve the timing violations at the DBI circuit. The current circuit can be implemented for wide buses with high throughput without having to add additional outputs, thereby making this a robustly scalable solution. The only output that is required is a single signal line for transmitting inversion control signal for the data bits transmitted via the data path.

FIG. 4 illustrates a representation of a waveform resulting from the implementation of a DBI circuit that includes a plurality of majority vote functions, in one embodiment. In this embodiment, the bandwidth of the communication bus (i.e. data path) is considered to be equal to 4 (N=4). The bandwidth is for illustration purpose and is not to be considered restrictive. As a result, the bandwidth of the communication bus can be greater than 4, even multiples of 4, for e.g., equal to 8, 16, etc. The input data bits are received at the DBI circuit in distinct phases based on clock signal with the arrival of each input data bit of input data coinciding with the rising edge or falling edge of consecutive clock cycle. For the embodiment illustrated in FIG. 4, 4 phases are identified. A plurality of delay circuit elements and majority vote functions are employed to work in parallel using multi-cycle approach. In the embodiment illustrated in FIG. 4, 4 units of first set of XOR gates (i.e. delay circuit elements) and 4 majority vote functions are employed to work in parallel within the DBI circuit. At every phase of the clock cycle, a specific majority vote function is initiated or activated. The circuit waits for the data bits to reach a stable state before forwarding to the majority vote function. Delay circuit is employed as a staging area for the data bits as the data bits arrive at the DBI circuit at distinct clock cycles. The delay circuit waits for the data bit to stabilize in value prior to forwarding to the first XOR gate within the delay circuit. From the above example, data bit 0 arrives at the circuit at Phase 1_0 and stabilizes at the falling edge of the phase 1_0 clock cycle. Data bit 1 arrives at the circuit at Phase 1_1 and stabilizes at the falling edge of the phase 1_1 clock cycle. Upon reaching stable state, consecutive data bits 0 and 1 and are output from the delay circuit 1. Majority vote function 1 obtains the output from the delay circuit 1. At the next clock cycle, data bit 2 arrives at the circuit at Phase 1_2 and the delay circuit processes the data bits and generates output of consecutive data bits 1 and 2 that is obtained by majority vote function 2, and so on. As more and more data bits arrive at the circuit and are processed by the corresponding delay circuit to generate outputs of sets of consecutive data bits, corresponding majority vote functions will be employed to process the sets of consecutive data bits at distinct clock cycles. The DBI circuit employs multi-cycle constraint approach to process the data bits received at the circuit. In the multi-cycle constraint approach, the algorithm is designed to enable each of the majority vote function to process the set of consecutive data bits to meet the timing requirements of the electronic circuit. In the current embodiment, the timing requirement may be 4 clock cycles. This means that each majority vote function working in parallel will have 4 clock cycles to process the set of consecutive data bits before the majority vote function is employed to process subsequent set of consecutive data bits.

For example, as illustrated in FIG. 4, delay circuit element 1 is employed to receive the data bits 0 and 1 at clock phase 1_1 and forward the data bits (represented as Majority1_A_in, Majority1_B_in) to the XOR gate 1 (or comparator 1) which outputs the pair of consecutive data bits 0 and 1. Majority vote function 1 will obtain the output from the delay circuit element 1 and process the data bits to generate a corresponding majority data output, represented as Majority1_out. Similarly, when data bit 2 arrives and achieves a stable state at phase 1_2, second pair of data bits 1 and 2 are forwarded to XOR gate 2, which provides the next set of consecutive data bits to majority vote function 2 as inputs (represented as Majority2_A_in, Majority2_B_in) to generate corresponding output (represented as Majority2_out), and so on. After the 4th clock pulse (represented as Phase2_1), when successive data bit 4 arrives and reaches a stable state at the delay circuit, the logic built in the delay circuit will determine that the maximum number of XOR gate and majority vote function for processing the data bits has been reached by the previous set of data bits and force a delay in the circuit, called the pipeline delay, causing the delay circuit to revert back to employing XOR gate 1 and majority vote function 1 to process next set of data bits 3 and 4, and so on. Thus, XOR gate 1 and majority vote function 1 will be triggered to process data bits 0 and 1, XOR gate 2 and majority vote function 2 will be triggered to process data bits 1 and 2, XOR gate 3 and majority vote function 3 will be triggered to process data bits 2 and 3, XOR gate 1 and majority vote function 1 will be triggered to process data bits 3 and 4, XOR gate 2 and majority vote function 2 will be triggered to process data bits 4 and 5, XOR gate 3 and majority vote function 3 will be triggered to process data bits 5 and 6, and so on. Based on the multi-cycle constraint approach of the current embodiment, each of the majority vote functions employed within the DBI circuit will have 4 clock cycles to complete processing of respective pairs of data bits before the majority vote function is assigned subsequent pairs of data bits to synthesize.

It should be noted herein that such a multi-cycle approach can be implemented only when feedback data is not considered as one of the inputs to the majority vote functions. By using consecutive pairs of data bits from input data that have already reached stable states, as inputs to the majority vote function and pushing the feedback data away from the majority vote function, the current embodiments enable the implementation of the multi-cycle approach, thereby avoiding the timing violation at the majority vote function.

The various outputs from the plurality of majority vote functions at each phase are forwarded to the Phase MUX, which selects the appropriate majority data output for processing at the second XOR gate. The second XOR gate, in response to receiving the majority data output from the Phase MUX, retrieves feedback data from a preceding inversion control output and process the two data to determine if the data bits transmitted through the data bus needs to be inverted. The preceding inversion control output data, in one embodiment, is retrieved from a register. Based on the determination, the inversion control signal is generated encoding inversion control information. The inversion control signal is forwarded to the receiver through an inversion control signal line, to the data queue circuit to enable selection of appropriate form of the data bits communicated along the data path and is also stored in the register for subsequent processing of the majority data output.

The various embodiments implementing the DBI circuit have resulted in significant reduction in simultaneous switching of output (SSO) while addressing the bottleneck issues at the majority vote functions. For instance, for an 8 bit bandwidth of the data path along which input data from the transmitter is transmitted to the receiver through the DBI circuit, without the current implementation of dynamic bus inversion (DBI) circuit, maximum SSO was equal to 8 out of 8 and average SSO was 4 out of 8. With the implementation of the DBI algorithm of the current embodiments that employs plurality of majority vote functions and multi-cycle approach, the maximum SSO can be reduced from 8 out of 8 to about 4 out of 9 (the $9^{th}$ output being the dedicated inversion control signal line) and the average SSO can be reduced from 4 out of 8 to about 3.2734 out of 9, as illustrated in FIG. 5.

Figure 6:
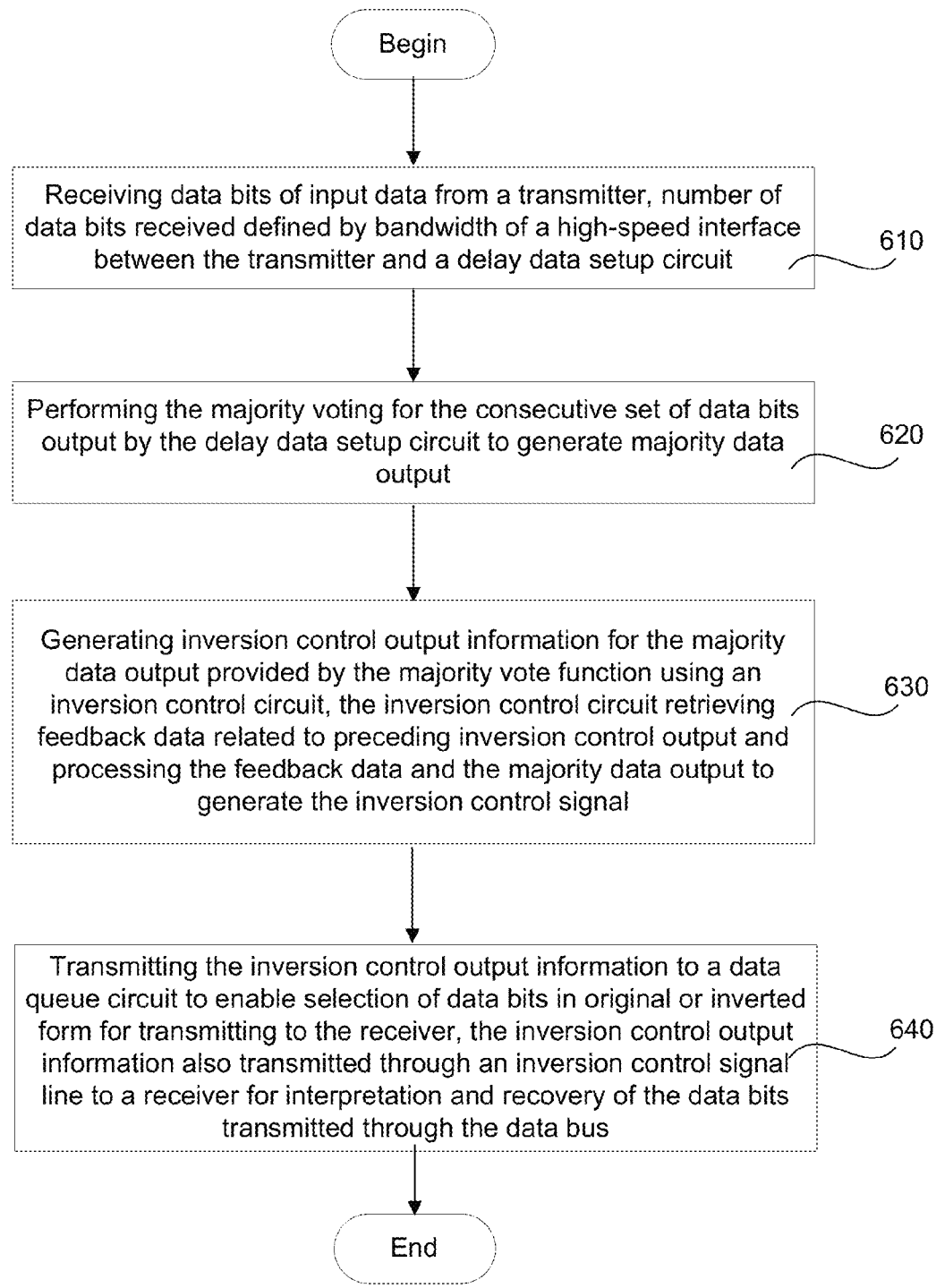
FIG. 6 illustrates process flow operations of a method for providing a dynamic bus inversion, in accordance with one embodiment of the present invention.

FIG. 6 shows a method for implementing a dynamic bus inversion, in accordance with one embodiment of the present invention. The method begins at operation 610 where data bits of input data transmitted from a transmitter is received at a delay data setup circuit (or simply a delay circuit) of the DBI circuit. The DBI circuit is coupled between a transmitter and a receiver and is configured to receive and process data bits before the data is transmitted to the receiver. The delay data setup circuit identifies a set of consecutive data bits and processes the consecutive data bits through a first XOR gate. Output from the first XOR gate is used by the majority vote function for generating majority data output. In response to receiving the output from the first XOR gate, the majority voting is performed by a majority vote function circuit to generate the majority data output, as illustrated in operation 620. To speed up the process of data transmission a plurality of majority vote functions are employed with each majority vote function processing a distinct set of consecutive data bits from a corresponding delay circuit element of the delay circuit. The processing of respective set of consecutive data bits by each majority vote function is performed in a defined number of clock cycles, and in one embodiment, the defined number of clock cycles is driven by a bandwidth of the data path along which the input data is transmitted from the transmitter to the delay data circuit. The majority data output from each majority vote function is analyzed by an inversion control circuit to determine if the data bits transmitted along the data path needs to be inverted or not. The inversion control circuit retrieves feedback data from a preceding inversion control output and analyzes the feedback data and the majority data output. Based on the analysis, inversion control signal is generated, as illustrated in operation 630. To assist in the analysis, a second XOR gate is employed within the inversion control circuit. The second XOR gate analyzes the two data to determine if the data bits transmitted along the data path needs to be inverted and encodes appropriate information in the inversion control signal generated by the second XOR gate. The inversion control signal with the encoded information related to the inversion of the data bits is transmitted to a data queue circuit so that the data queue circuit can select the data bits in the original form or the inverted form for transmitting to the receiver, as illustrated in operation 640. The inversion control output information is also transmitted to the receiver on a inversion control signal line so that the receiver can interpret the information and recover the data bits transmitted along the data path. Upon receipt of the inversion control output, the receiver device decodes the information to determine if inversion of the data bits was performed at the DBI circuit and recovers the data bits transmitted along the data path based on the interpretation. The receiver may perform dynamic data inversion in order to recover the original data transmitted by the transmitter.

The invention described herein can be embodied as computer readable code on a computer readable medium. The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, solid-state digital data storage devices, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A dynamic bus inversion (DBI) circuit, comprising:
   delay data setup circuitry configured to produce consecutive bit outputs, each consecutive bit output corresponding to a distinct set of bits of consecutive data within a data path;
   majority vote circuitry configured to generate majority data outputs by performing majority voting for the consecutive bit outputs, wherein the consecutive bit outputs are produced by the delay data setup circuitry prior to the consecutive data being transmitted on the bus of the data path; and
   an inversion control circuit configured to generate inversion output signals used for performing inversion control on the bus, wherein, to generate the inversion output signal for data that is consecutive with preceding data in the data path, the inversion control circuit is configured to:
      receive the majority data output from the majority vote circuitry,
      retrieve feedback data, the feedback data comprising a preceding inversion output signal generated to perform inversion control for transmission of the preceding data on the bus, and
      generate the inversion control signal for the data based on whether the preceding inversion signal corresponds to inversion of the preceding data for transmission on the bus, and whether the received majority data output for the data indicates that a majority of bits of the data differ from corresponding bits of the preceding data, the received majority data output generated from consecutive bit outputs produced prior to the preceding data being transmitted on the bus.

2. The circuit of claim 1, wherein the data path comprises:
   a data queue configured to store data to be transmitted on the bus of the data path; and
   a selection circuit, the selection circuit receiving the inversion output signal generated by the inversion control circuit and selecting one of an inverted and non-inverted form of data obtained from the data queue for transmission on the bus based on the inversion output signal.

3. The circuit of claim 1, wherein the delay data setup circuitry comprises a register configured to store the preceding data prior to the preceding data being transmitted on the bus and to produce the consecutive bit outputs in response to receiving the data, each consecutive bit output corresponding to a distinct set of bits, including a bit of the data and a corresponding bit of the preceding data stored in the register,
   wherein the majority vote circuitry is configured to generate the majority data output by performing majority voting for the consecutive bit outputs.

4. The circuit of claim 1, wherein the majority vote circuitry comprises a plurality of majority vote function circuits, each majority vote function circuit configured to perform majority voting for a respective one of the distinct sets of bits of consecutive data within the data path.

5. The circuit of claim 4, wherein the delay data setup circuitry comprises a plurality of delay data setup circuits, each delay data setup circuit configured to produce a respective one of the consecutive bit outputs for a respective one of the majority vote function circuits.

6. The circuit of claim 5, wherein each of the delay data setup circuits comprises a register to store a respective bit of the preceding data, and wherein each delay data setup circuit produces a respective consecutive bit output indicating whether one of the bits of the data differs from a corresponding bit of the preceding data.

7. The circuit of claim 5, wherein a number of majority vote function circuits and a number of delay data setup circuits corresponds to a data bandwidth of the data path.

8. The circuit of claim 1, wherein the inversion control circuit is configured to generate the inversion output signal for the data such that:

when the preceding inversion output signal corresponds to inversion of the preceding data on the bus, inversion control circuit generates the inversion output signal for the data to correspond to an inverse from the majority data output, and when the preceding inversion output signal corresponds to non-inversion of the preceding data on the bus, the inversion control circuit generates the inversion output signal to correspond to the majority data output.

9. The circuit of claim 8, wherein the inversion control circuit comprises logic configured to perform an XOR function on the received majority data output and the preceding inversion output signal.

10. The circuit of claim 1, further comprising a transmitter configured to transmit the data with the inversion control signal generated for the data to a receiver on the bus, wherein the receiver comprises a DBI receive circuit configured to interpret the data transmitted on the bus using the transmitted inversion output signal.

11. A method for implementing dynamic bus inversion (DBI) on a bus of a data path, the method comprising:
generating a first inversion control signal, the first inversion control signal for performing inversion control for communication of the first data on the bus of the data path;
storing the first inversion control signal in a feedback register; and
generating a second inversion control signal, the second inversion control signal for performing inversion control for communication of second data on the bus, wherein the second data follows the first data consecutively in the data path, and wherein generating the second inversion control signal comprises:
storing data bits of the first data prior to performing the inversion control for communication of the first data on the bus,
forming a plurality of distinct sets of consecutive data bits, each of the distinct sets of consecutive data bits comprising a data bit of the second data and a stored data bit of the first data,
generating a majority data output for the second data using the distinct sets of consecutive data bits, wherein generating the majority data output for the second data comprises performing majority voting for each of the plurality of distinct sets of consecutive data bits,
retrieving the first inversion control signal from the feedback register, and
generating the second inversion control signal from the first inversion control signal and the majority data output, wherein the majority data output for the second data indicates whether a majority of the data bits of the second data differ from corresponding stored data bits of the first data, the corresponding data bits of the first data being stored prior to performing the inversion control for communication of the first data on the bus,
wherein the inverter uses the first inversion control signal to control inversion of the first data on the bus and uses the second inversion control signal to control inversion of the second data for communication on the bus.

12. The method of claim 11, further comprising transmitting one or more of the first inversion control signal and the second inversion control signal on the bus.

13. The method of claim 11, wherein the majority data output for the second data is generated by a majority vote function circuit that precedes an inversion control circuit in the data path.

14. The method of claim 11, wherein generating the majority data output for the second data comprises performing majority voting for each of the plurality of distinct sets of consecutive data bits, each distinct set of consecutive data bits indicating whether corresponding data bits differ between the second data and the first data in parallel.

15. The method of claim 11, wherein the majority voting is performed using a plurality of independent majority vote circuits, each majority vote circuit configured to process a respective one of the distinct sets of consecutive data bits.

16. The method of claim 15, wherein each of the plurality of distinct sets of consecutive data bits are formed by a respective delay data circuit, each delay data circuit corresponding to a respective one of the independent majority vote circuits.

17. The method of claim 11, wherein generating the second inversion control signal further comprises:
determining whether the first inversion control signal corresponds to one of non-inversion of the first data for communication on the bus and inversion of the first data for communication on the bus;
generating the second inversion control signal to correspond to the majority data output for the second data in response to determining that the first inversion control signal corresponds to non-inversion of the first data, and
generating the second inversion control signal to correspond to an inverse of the majority data output for the second data in response to determining that the first inversion control signal corresponds to inversion of the first data.

18. A dynamic bus inversion (DBI) circuit for coupling between a transmitter and a receiver, the DBI circuit configured to generate an inversion control signal that is communicated to the receiver and used to perform inversion control on data communicated along a data path between the transmitter and the receiver, the circuit comprising:
delay data setup circuitry comprising a plurality of delay data setup circuits, each delay data setup circuit configured to store a data bit of first data that precedes second data in the data path and to produce a respective consecutive data output corresponding to a data bit of the second data associated with the stored data bit of the first data;
majority vote circuitry comprising a plurality of majority vote function circuits, each majority vote function circuit to perform a majority vote function on the consecutive data output produced by a respective one of the plurality of delay data setup circuits, the majority vote circuitry configured to generate a majority vote output for the second data using the majority vote function circuits, the majority vote output indicating whether a majority of data bits of the second data differ from associated data bits of the first data;
an inversion control circuit configured to generate inversion control signals for data communicated on a bus of the data path, wherein the inversion control circuit is configured to generate a first inversion control signal prior to communication of the first data on the bus, and wherein, to generate a second inversion control signal for the second data, the inversion control circuit is configured to:

receive the majority data output for the second data from the majority vote circuitry, retrieve feedback data from a preceding inversion control output of the inversion control circuit, the feedback data comprising the first inversion control signal, generate the second inversion control signal using the majority data output for the second data and the first inversion control signal; and an inverter circuit configured to selectively invert data for communication on the bus based on the inversion control signals generated by the inversion control circuit, wherein the inverter circuit follows the delay data setup circuitry in the data path, such that the delay data circuits store respective data bits of the first data before the first data are received at the inverter circuit.

19. The circuit of claim 18, wherein the majority vote circuitry comprises a plurality of different sets of majority vote function circuits, each set of majority vote function circuits configured to perform majority vote functions on a set of consecutive data outputs corresponding to a respective phase of a clock cycle associated with the circuit, wherein the majority vote circuitry further comprises a phase multiplexer configured to select a majority data output corresponding to any one of the sets of majority vote function circuits for forwarding to the inversion control circuit at each phase of the clock cycle.

20. The circuit of claim 18, wherein the inversion control circuit includes storage to store the preceding inversion control output for retrieval as feedback data during subsequent processing.

* * * * *